United States Patent [19]

Riding

[11] Patent Number: 5,504,130
[45] Date of Patent: *Apr. 2, 1996

[54] COMPOSITIONS OF POLY(PHENYLENE ETHER) AND POLYESTER RESINS, WHICH EXHIBIT IMPROVED FLOW

[75] Inventor: Geoffrey H. Riding, Castleton, N.Y.

[73] Assignee: General Electric Company, Pittsfield, Mass.

[*] Notice: The term of this patent shall not extend beyond the expiration date of Pat. No. 5,489,640.

[21] Appl. No.: 300,304

[22] Filed: Sep. 1, 1994

[51] Int. Cl.$^6$ .................... C08J 5/10; C08L 71/12
[52] U.S. Cl. .................... 524/270; 524/271; 524/271; 524/77; 524/492; 524/494; 524/493; 524/451; 524/449; 524/423; 524/425; 525/394; 525/133
[58] Field of Search ................... 525/394, 133; 524/270, 271, 272, 77, 492, 494, 493, 451, 449, 423, 425

[56] References Cited

U.S. PATENT DOCUMENTS

| | | | |
|---|---|---|---|
| 3,692,844 | 9/1972 | Hollis et al. | 260/619 D |
| 4,113,692 | 9/1978 | Wambach | 260/40 R |
| 4,124,561 | 11/1978 | Phelps et al. | 260/40 R |
| 4,140,669 | 2/1979 | Phipps et al. | 260/40 R |
| 4,185,047 | 1/1980 | Cohen | 575/94 |
| 4,271,064 | 6/1981 | Dieck | 260/40 R |
| 4,280,949 | 7/1981 | Dieck | 260/40 R |
| 4,290,937 | 9/1981 | Cohen | 260/40 R |
| 4,296,021 | 10/1981 | Wambach | 260/40 R |
| 4,386,027 | 5/1983 | Cohen | 523/210 |
| 4,401,792 | 8/1983 | Axelrod et al. | 525/175 |
| 4,436,860 | 3/1984 | Hepp | 524/394 |
| 4,451,606 | 5/1984 | Campbell | 524/445 |
| 4,467,057 | 8/1984 | Dieck et al. | 523/212 |
| 4,532,281 | 7/1985 | Lee, Jr. et al. | 524/141 |
| 4,532,290 | 7/1985 | Jacquiss et al. | 524/417 |
| 4,560,722 | 12/1985 | Tyrell | 524/405 |
| 4,672,086 | 6/1987 | Seiler et al. | 524/127 |
| 4,786,664 | 11/1988 | Yates | 524/417 |
| 4,816,510 | 3/1989 | Yates | 524/449 |
| 4,831,087 | 5/1989 | Brown | 525/394 |
| 4,866,130 | 9/1989 | Brown et al. | 525/92 |
| 4,879,346 | 11/1989 | Bopp et al. | 525/146 |
| 4,927,881 | 5/1990 | Brown | 525/92 |
| 4,935,472 | 6/1990 | Brown et al. | 525/394 |
| 4,978,715 | 12/1990 | Brown et al. | 525/92 |
| 4,997,612 | 3/1991 | Gianchandai et al. | 264/211 |
| 5,079,297 | 1/1992 | Brown et al. | 525/92 |
| 5,081,184 | 1/1992 | Brown et al. | 525/67 |
| 5,091,472 | 2/1992 | Brown et al. | 525/92 |
| 5,115,016 | 5/1992 | Dickens et al. | 524/513 |
| 5,151,460 | 9/1992 | Yates, III et al. | 524/291 |
| 5,162,412 | 11/1992 | Liu | 524/291 |
| 5,258,215 | 11/1993 | van Es et al. | 428/64 |

OTHER PUBLICATIONS

Encyclopedia of Polymer Science and Technology, vol. 13, 1970; pp. 590–593.

*Primary Examiner*—Paul R. Michl
*Assistant Examiner*—U. K. Rajguru

[57] ABSTRACT

Disclosed are compositions having the characteristic of improved flow for compositions comprising a poly(phenylene ether) resin, a polyester resin, a polycarbonate resin, a reinforcing filler, a terpene phenol resin. The compositions may further comprise at least one additional material from the group consisting of impact modifiers, non-elastomeric polymers of an alkenyl aromatic compound and an additive package. The heat distortion temperature of the compositions can be further improved with the addition of an optional non-reinforcing filler in combination with a poly(tetrafluoroethylene) resin without significant loss of the physical properties.

23 Claims, No Drawings

COMPOSITIONS OF POLY(PHENYLENE ETHER) AND POLYESTER RESINS, WHICH EXHIBIT IMPROVED FLOW

BACKGROUND OF THE INVENTION

1. Field of the Invention

This invention relates to reinforced poly(phenylene ether)polyester compositions which exhibit enhanced properties, such as improved flow.

2. Brief Description of the Related Art

Poly(phenylene ether) resins (referred to hereafter as "PPE") are commercially attractive materials because of their unique combination of properties, for example, high strength, dimensional and hydrolytic stability, and dielectric properties. Furthermore, the combination of these resins with polyester resins into compatibilized blends results in additional overall properties such as improved chemical resistance necessary for many automotive applications. Examples of PPE-polyester blends compatibilized with an effective amount of a polycarbonate resin can be found in U.S. Pat. Nos. 4,831,087, 4,927,881 and 4,978,715, which are all incorporated herein by reference.

The overall physical properties of reinforced PPE-polyester blends would make them attractive for a variety of articles in the automotive market. Many of these same articles are preferentially produced using conversion techniques such as injection molding. Some of the most desirable applications, for example, instrument panels have very long flow lengths and therefore require resins that have very low viscosities in order to completely till the molding tools. Reinforced PPE-polyester blends have inadequate flow properties at the processing temperatures that are needed to minimize the thermal degradation of the resins. Increasing the processing temperature to very high temperatures in order to reduce viscosity of the blends results in brittle parts and many surface imperfections in the final part, both of which are unacceptable.

Additives that increase the flow of other resin compositions are generally not usefuls in PPE-polyester compositions as they typically act to improve the flow by lowering the molecular weight of one of the components of the composition, or they result in significant loss in the heat resistance of the composition. These results are unsatisfactory,. Thus, one of the goals of the present invention is to improve the flow of PPE-polyester compositions while retaining or enhancing the physical properties.

SUMMARY OF THE INVENTION

The long felt needs discussed above have been generally satisfied by the discovery of an improved thermoplastic composition which comprises:

a) a poly(phenylene ether) resin;

b) a polyester resin;

c) an amount of a polycarbonate resin sufficient to effectively enhance the ductility of the composition;

d) an amount of at least one reinforcing filler sufficient to effectively increase the stiffness of the composition; and e) a flow promoting amount of a terpene-phenol material.

The composition may further comprise at least one of each of the following optional additional materials:

f) an amount of a non-fibrous filler in combination with a poly(tetrafluoroethylene) resin sufficient to effectively enhance the heat distortion temperature of the composition;

g) an impact modifier;

h) a non-elastomeric polymer of an alkenylaromatic compound; and i) an additive package comprising at least one additive selected from the group consisting of hindered phenols, thio compounds and fatty amides.

DETAILED DESCRIPTION OF THE INVENTION

The PPE employed as Component A in the present invention are known polymers comprising a plurality of structural units of the formula (I):

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Preferably, each $Q^1$ is alkyl or phenyl, especially $C_{1-4}$ alkyl, and each $Q^2$ is hydrogen.

Both homopolymer and copolymer PPE are included. The preferred homopolymers are those containing 2,6-dimethyl-1,4phenylene ether units. Suitable copolymers include random copolymers containing, for example, such units in combination with 2,3,6-trimethyl-1,4-phenylene ether units. Also included are PPE containing moieties prepared by grafting vinyl monomers or polymers such as polystyrenes, as well as coupled PPE in which coupling agents such as low molecular weight polycarbonates, quinones, heterocycles and formals undergo reaction in known manner with the hydroxy groups of two PPE chains to produce a higher molecular weight polymer, provided a substantial proportion of free OH groups remains.

The PPE generally have a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 77° F.

The PPE are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful PPE for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the PPE contemplated for use in the present invention include all those presently known, irrespective of variations in structural units or ancillary chemical features.

The use of PPE containing substantial amounts of unneutralized amino nitrogen may, under certain conditions, afford compositions with undesirably low impact and/or tensile strengths. The possible reasons for this are explained hereinafter. The amino compounds include, in addition to the aminoalkyl end groups, traces of amine (particularly secondary amine) originating in the catalyst used to form the PPE.

It has further been found that the properties of the compositions can often be improved in several respects, particularly impact strength, by removing or inactivating a substantial proportion of the amino compounds in the PPE. Polymers so treated are sometimes referred to hereinafter as "inactivated PPE". They preferably contain unneutralized amino nitrogen, if any, in amounts no greater than 800 ppm. and more preferably in the range of about 200–800 ppm., as determined by the Kjeldahl method. Various means for inactivation have been developed in any one or more thereof may be used.

A method of inactivation is by extrusion of the PPE under compounding conditions with vacuum venting. This may be achieved either in a preliminary, extrusion step (which is sometimes preferred) or during extrusion of the composition of this invention, by connecting a vent of the extruder to a vacuum source capable of reducing the pressure to about 20 torr or less.

It is believed that the inactivation method aids in the removal by evaporation of any traces of free amines (predominantly secondary amines) in the polymer, including thermally labile amines from the PPE during compounding. PPE having a free amine nitrogen content below about 600 ppm. have been found particularly useful in this invention.. However, the invention is not dependent on any theory of inactivation.

Polyesters suitable for preparing the present compositions include those comprising structural units of the formula (II):

wherein each $R^1$ is independently a divalent aliphatic hydrocarbon, alicyclic hydrocarbon, aromatic hydrocarbon, polyoxyalkylene radical, or mixtures thereof and each $A^1$ is independently a divalent aliphatic, alicyclic or aromatic radical, or mixtures thereof. Examples of suitable polyesters containing the structure of formula (II) are poly(alkylene dicarboxylates), elastomeric polyesters, liquid crystalline polyesters, polyarylates, and polyester copolymers such as copolyestercarbonates. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^1$ radical in the above formula (II) is most often p- or m-phenylene or a mixture thereof. As previously noted, this class of polyester includes the poly(alkylene terephthalates) and the polyarylates. Such polyesters are known in the art as illustrated by the following U.S. Pat. Nos., which are incorporated herein by reference.

2,465,319 2,720,502 2,727,881 2,822,348 3,047,539
3,671,487 3,953,394 4,128,526

The poly(alkylene terephthalates), for example, poly(ethylene terephthalate) (commonly abbreviated as "PET"), poly(cyclohexylene terephthalate) (commonly abbreviated as "PCT"), and poly(butylene terephthalate) (commonly abbreviated as "PBT") are often the preferred polyesters for the present invention, with poly(ethylene terephthalate) (PET) being the most preferred member. Various mixtures of PET, PCT and PBT are also sometimes very suitable.

The polyester may include structural units of the formula (III):

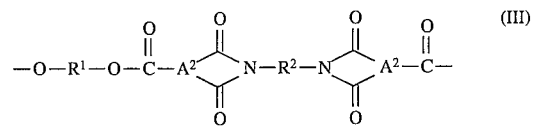

wherein $R^1$ is as previously defined for FIG. II. $R^2$ is a polyoxyalkylene radical and $A^2$ is a trivalent aromatic radical, usually derived from trimellitic acid and has the structure (IV):

Such polymers and their mode of preparation are described for example in U.S. Pat. Nos. 4,544,734, 4,556,705, and 4,556,688, which are all incorporated herein by reference.

Because of the tendency of polyesters to undergo hydrolytic degradation at the high extrusion and molding temperatures encountered by the compositions of this invention, it is preferred that the polyester be substantially free of water. The polyester may be predried before admixing with the other ingredients. More commonly, the polyester is used without predrying and the volatile materials are removed through the use of vacuum venting the extruder as previously described for the inactivation of the PPE.

The polyesters generally have number average molecular weights in the range of about 20,000–70,000, as determined by intrinsic viscosity (I.V.) at 86° F. in a 60:40 by weight mixture of phenol and 1,1,2,2-tetrachloroethane.

According to the present invention, the tendency of blends of components A and B to be incompatible is overcome by incorporating component C, a polymer containing a substantial proportion of aromatic polycarbonate units. Substantial proportion generally means greater than about 20 percent by weight of polycarbonate units in the polymer. Amongst the preferred polymers of this type are the polycarbonate resins. The polycarbonate materials comprise structural units of the formula (V),

wherein $R^3$ is a divalent organic radical.

Suitable $R^3$ values in formula (V) include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^3$ radicals are hydrocarbon radicals although mixtures of various radicals may also be useful.

Preferably, at least about 60% and more preferably at least about 80% of the total number of $R^3$ values in the cyclic oligomer mixtures, and most desirably all of said $R^3$ values, are aromatic. The aromatic $R^3$ radicals preferable have the formula (VI):

wherein each of $A^1$ and $A^2$ is a monocyclic divalent aromatic radical and Y is a bridging radical in which one or two atoms separate $A^1$ form $A^2$. The free valence bonds in formula (VI) are usually in the meta or para positions of $A^1$ and $A^2$ in relation to Y.

In formula (VI), the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferable p-phenylene, although both may be o-phenylene or m-phenylene, or one o-phenylene or m-phenylene and the other p-phenylene.

The bridging radical, Y, is one in which one or two atoms, preferable one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula (VI) is the 2,2-bis(4-phenylene)propane radical, which is derived from bisphenol A and in which Y is isopropylidene and $A^1$ and $A^2$ are each p-phenylene.

The weight average molecular weight of the polycarbonate material should be at least about 40,000 (as determined by gel permeation chromatography relative to polystyrene). It is most often in the range of about 40,000–80,000. However, compositions in which component C has a higher molecular weight often have favorable ductility as the expense of decreased flow. The exact molecular weight utilized will depend, in part, on the end-use requirements of the desired application and the degree of molding difficulty encountered in forming the part.

In most instances, component C, the polycarbonate material, consists of a homo-polycarbonate or even a copolycarbonate, such as a copoly(ester carbonate). It is within the scope of the invention, however, to use as component C a blend of a polycarbonate material, or a mixture of polycarbonate materials, with a styrene homopolymer. The polystyrene polymer typically has a number average molecular weight of about 50,000–250,000 and such blends generally contain at least about 50% of the polycarbonate material by weight.

The compositions of the invention also comprise reinforcing fillers as component D. Suitable reinforcing fillers are those which increase the rigidity of the blend. Amongst these, fibrous materials are preferred, in particular glass fibers made from low alkali E-glass, having a fiber diameter of from about 8–14 μm, the length of the glass fibers in the finished injection molding being from 0.01 mm to 0.5 mm. The glass fibers may be employed as rovings or as chopped or milled glass fibers, and may be provided with a suitable finish and an adhesion promoter or promoter system based on silanes. The amount of the reinforcing filler is generally an amount sufficient to increase the rigidity of the composition. The amount of reinforcing fillers, based on the total weight of the composition, is advantageously from about 5% to about 60% by weight, especially from about 10% to about 40% by weight.

However, other fibrous reinforcing materials, e.g. carbon fibers and micro fibers, potassium titanate single-crystal fibers, gypsum fibers, aluminum oxide fibers or asbestos may also be incorporated. Non-fibrous fillers, such as, for example, glass beads and hollow glass beads are further preferred fillers, as are various combinations of these materials with glass fibers. Like the glass fibers, these latter fillers may be provided with a finish and/or an adhesion promoter or adhesion promoter system.

The compositions may also contain an amount of a terpene phenol material to effectively improve the flow of the composition as component E. The preferred terpene phenol material comprises a condensate of α-pinene and phenol having a α-pinene to phenol weight ratio greater than about 1:1 and a softening point greater than about 212° F., preferably greater than about 240° F. The terpene phenol material can be made, for example, by treating about a 2:1 molar ratio of α-pinene:phenol with about 0.05–1.5 molar % boron trifluoride at about 120° F. to about 170° F. for at least about 1 hour followed by removing the catalyst with distillation under reduced pressure. Illustrative preparations for terpene phenol condensates can be found in U.S. Pat. Nos. 3,448,178, 3,692,844 and 5,164,357, all of which are incorporated herein by reference. A preferred terpene phenol material is available from Arizona Chemical Co. under the trademark NIREZ and sold as NIREZ 2019 resin.

Component F is an optional component of the invention and is a heat enhancing mixture comprising non-fibrous fillers and polytetrafluoroethylene resin. The non-fibrous fillers are mineral components that can be selected, for instance, from among talcs, clays, micas, metal sulfates, calcium carbonates and various silicates. These minerals typically have a small average particle size, generally under about 40 microns in size, preferably under about 20 microns and most preferably under about 15 microns. The minerals may be used alone or as a mixture of minerals. The minerals may also contain various surface treatments. Fine particle talcs having an average particle sizes under about 20 microns are the preferred minerals. A preferred commercially available talc is available from the Montana Talc Company under the trademark NICRON, and sold as NICRON 500.

The minerals are used in combination with polytetrafluoroethylene resin, which are commercially available or can be prepared by conventional means. They are normally white solids which are obtained, for example, by polymerizing tetrafluorethylene in aqueous media in the presence of a free radical catalyst at a pressure of from about 100 to about 1,000 psi and at a temperature of from about 32° F. to about 400° F. A preferred commercially available polytetrafluoroethylene resin from ICI under the trademark WITCON and sold as TL-155.

The compositions of the present invention may also contain at least one impact modifier as component G. The preferred impact modifiers are block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are commercially available from Shell Chemical Company under the trademark KRATON, and include D1101, D1102, G1650, G1651, G1652, G1701 and G1702.

The amount of the impact modifier generally present will vary upon the impact levels which are desired as well as the constraints by the remaining physical properties. Generally, the impact modifier is present in the range of about 1% to about 15% by weight based on the total weight of the composition. The preferred range is about 3% to about 10% by weight based on the total weight of the composition.

The compositions of the present invention may also contain at least one non-elastomeric polymer of an alkenylaromatic compound as component H. Suitable polymers of this type may be prepared by methods known in the art including bulk, suspension and emulsion polymerization. They generally contain at least 25% by weight of structural units derived from an alkenylaromatic monomer of the formula (VII)

wherein $R^5$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98-78% styrene and about 2-32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from Fina Oil under the trademark FINACLEAR resins and from Phillips 66 under the trademark K-RESINS.

The amount of the non-elastomeric polymer of an alkenylaromatic compound, when one is used, is in the range of up to about 20% by weight based on the total weight of the composition. The preferred range, based on the total weight of the composition, is from about 1% to about 15% by weight, and the most preferred range is about 3% to about 12% by weight based on the total weight of the composition.

Compositions of the present invention can also include, as component I, effective amounts of at least one additive selected from the group consisting of anti-oxidants, flame retardants, drip retardants, dyes, pigments, colorants, stabilizers, antistatic agents, plasticizers and lubricants. These additives are known in the art, as are their effective levels and methods of incorporation. Effective amounts of the additives vary widely, but they are usually present in an amount up to about 50% or more by weight, based on the weight of the entire composition. Especially preferred additives include hindered phenols, thio compounds and amides derived from various fatty acids. The preferred amounts of these additives generally range up to about 2% total combined weight based on the total weight of the composition.

The preparation of the compositions of the present invention is normally achieved by merely blending the ingredients under conditions for the formation of an intimate blend. Such conditions often include mixing in single or twin screw type extruders or similar mixing devices which can apply a shear to the components. It is often advantageous to apply a vacuum to the melt through a vent port in the extruder to remove volatile impurities in the composition.

All of the ingredients may be added initially to the processing system, or else certain additives may be precompounded with each other or with one of the primary polymer components, PPE, polyester and polycarbonate resin. It appears that certain properties, such as impact strength and elongation, are sometimes enhanced by initially precompounding the PPE with the other ingredients prior to compounding with the glass fibers. While separate extruders may be used in the processing, these compositions may also be prepared by using a single extruder having multiple feed ports along its length to accommodate the addition of the various components. It is also sometimes advantageous to employ at least one vent port in each section between the feed ports to allow venting (either atmospheric or vacuum) of the melt. Those of ordinary skill in the art will be able to adjust blending times and temperatures, as well as component addition, without undue additional experimentation.

In one of its embodiments, the present invention is directed to a filled composition comprising the following components and any reaction products thereof, wherein all percentage proportions being by weight of the total composition:

A. about 15–50% of at least one poly(phenylene ether) resin or blend thereof with at least one non-elastomeric polymer of an alkenyl aromatic compound (component H);

B. about 20–80% of at least one polyester resin, the weight ratio of component A to component B being at most about 1.2:1;

C. about 3–50%, preferably of from about 8–20%, of at least one polymer containing a substantial proportion of aromatic polycarbonate units and having a weight average molecular weight of at least about 40,000 as determined by gel permeation chromatography relative to polystyrene or a blend thereof with a styrene homopolymer;

D. about 5–60% of at least one reinforcing filler, preferably comprising glass fibers, in an amount of from about 1–40% by weight; and E. up to about 20% by weight and preferably from about 1–15% by weight of a terpene-phenol material.

Incorporation of the flow promoter, component E, has been found to be effective for reducing the viscosity of the composition within the recommended processing temperature range while providing molded parts having excellent surface appearance and important physical property retention, especially heat distortion. Compositions comprising an effective amount of the terpene-phenol material generally have an improvement in flow of at least about 10% when compared to the same composition without the terpene-phenol material.

The above compositions may further comprise at least one of the following optional components, F to I, wherein all percentage proportions are by weight of the total composition:

F. about 0.05–5 % of a heat enhancing mixture of a non-fibrous filler selected from the group consisting of talcs, clays, micas, metal sulfates, calcium carbonates, various silicates and mixtures thereof and a poly(tetrafluoroethylene) resin wherein the weight ratio of the non-fibrous filler to poly(tetrafluoroethylene) resin is between about 1:4 and about 4:1.

Incorporation of such heat enhancing mixtures has been found to be effective for improving the heat resistance of the composition to at least about 250° F. while retaining the other physical properties. A preferred amount of the heat enhancing mixture is about 0.2% by weight of about a 1:1 weight ratio of a mixture of talc and poly(tetrafluoroethylene) resin.

G. Up to about 15% by weight and preferably from about 3% to about 10% by weight of an impact modifier, preferably block copolymers derived of alkenyl aromatic compounds and dienes.

For many thermoplastic applications where impact properties are also important, at least one rubbery impact modifier, component G, may also be incorporated. These may be utilized in effective amounts, generally up to about 15% by weight based on the total weight of the composition. The preferred compositions will contain of from about 3 to 10% by weight of impact modifier based on the weight of the total composition.

H. Up to about 20% by weight and preferably from about 1–12% by weight, of at least one non-elastomeric polymer of an alkenylaromatic compound.

For some applications, the flow and overall processability can be improved with the addition of at least one non-elastomeric polymer, component H, to the composition.

I. An effective amount of an additive package up to about 50% by weight and preferably comprising about a 1:1:2 weight ratio of a hindered phenol, thio compound and fatty amide wherein the total amount of the additive package is preferably up to about 2% by weight based on the total weight of the composition.

In a preferred embodiment of the invention, an effective additive package is utilized as component L which provides improved thermal aging resistance and oxidative stability, in addition to other enhancements, to the blends. The additive package may comprise a mixture consisting of at least one additive selected from the group consisting hindered phenols, thio compounds and fatty amides. A preferred example of an effective additive package comprises about 0.8 % by weight of about a 1:1:2 weight ratio of a hindered phenol:thio ester: fatty amide. Optimization of an exact amount and ratio would depend on the particular blend and desired end-use application requirements.

It is not certain whether any or all of the components in these compositions interact chemically upon blending. Therefore, the invention includes compositions comprising the above recited components and any reaction products thereof as well as any other optional components.

As previously mentioned, the proportions, based on the total weight of the composition, is generally as follows: for component A about 15–50% by weight; for component B about 20–80% by weight; for component C about 3–50% by weight; for component D about 5–60% by weight; for component E up to about 20% by weight; for optional component F up to about 5% by weight; for optional component G up to about 15% by weight; for optional component H up to about 20% by weight; and for optional component I up to about 50% by weight. The preferred ranges, all based the total weight of the composition, are a weight ratio of component A to component B of at most about 1.2:1, about 8–20% by weight for component C, about 10–40% by weight for component D, about 1–15% by weight for component E, about 0.05–5% by weight for component F, about 3–10% by weight for component G, about 1–15% by weight for component H and up to about 2% by weight for component I.

In various respects, the proportions of ingredients of this invention are an important consideration. When the weight ratio of component A to component B is much greater than about 1.2:1, the chemical resistance of the composition is adversely affected. When the amount of component C is much less than about 3% by weight, the ductility of the composition is reduced. Conversely, when the amount of component C is much greater than about 50% by weight, the heat distortion and chemical resistance of the composition is reduced. Component D, the reinforcing filler, is important in establishing the stiffness and strength of the composition. End-use applications generally require the level to fall within the range of about 5–60% and preferably with the range of about 10–40%. Optimization of the remaining ingredients has been previously discussed.

It should also be clear that improved molded articles prepared from the compositions of the present invention represent an additional embodiment of this invention.

The following examples are provided to illustrate some embodiments of the present invention. They are not intended to limit the invention in any aspect. All percentages are by weight based on the total weight of the entire composition, unless otherwise indicated. All parts are parts by weight.

EXAMPLES

In the following examples illustrating the inventions, the blend constituents used were as follows:

PPE-a poly(2,6-dimethyl-1,4-phenylene ether) resin having an intrinsic viscosity in chloroform at 77° F. of about 0.40 dl/gm.

PET-a poly(ethylene terephthalate) resin having an intrinsic viscosity in a 3:2 (by weight) mixture of phenol and 1,1,2,2-tetrachloroethane at 86° F. of about 0.65 dl/gm.

PC: a bisphenol A homopolycarbonate resin having a number average molecular weight of about 71,000.

IM: a commercially available triblock copolymer with polystyrene end blocks having a weight average molecular weight of about 29,000 and a hydrogenated butadiene midblock having a weight average molecular weight of about 116,000.

HIPS: Huntsman Chemicals Co. 1897 rubber modified polystyrene.

Glass: Owens-Corning 187A surface treated glass fiber having an average diameter of about 11 microns.

Talc: Montana Talc Co. NICRON 500 talc having an average particle size under about 20 microns.

PTFE: ICI WITCON TL-155 micropowder fluorinated polyethylene resin.

FP: Arizona Chemical NIREZ 2019 fluid, a copolymer [CAS no. 5359-84-6] of phenol and 2,6,6-trimethylbicyclo [3.1.1]hept-2-ene.

ADDS: about a 1:1:2 mixture of Ciba-Geigy IRGANOX 1010 hindered phenol: Argus SEENOX 412S thio compound: Humko Chemical Co. KEMAMIDE P-181 fatty amide.

The compositions of Table 1 were extruded on a Werner-Pfleiderer twin-screw extruder capable of multiple feed and venting locations using a barrel set temperature of about 550° F. and a vacuum of about 10–20 inches Hg applied to at least one vent port. All the ingredients with the exception of the glass fibers were fed into the feed throat of the extruder, heated and intimately admixed with a vacuum applied to the melted material through a first vacuum vent. The glass fibers were added at a point downstream of the first vacuum vent and and another vacuum was applied to the melt stream through a second vacuum vent located on the extruder after the addition port for the glass fibers. The extrudate was chopped into pellets, dried and molded using a Toshiba injection molding machine using a barrel set temperature of about 540° F. and a mold temperature of about 165° F. Samples of the compositions were also subjected to measurement of notched Izod impact strength according to ASTM D256 (employing a sample size of 2.5 inch by 0.5 inch by 0.125 inch), Dynatup (energy to fracture falling dart test) strength according to ASTM D3763 (using 4 inch diameter by 0.125 inch disks), flexural modulus and flexural strength according to ASTM D790 (employing a samples size of 6 inch by 0.5 inch by 0.25 inch), heat deflection under a load of 264 psi according to ASTM D648 (employing a sample size of 6 inch by 0.5 inch by 0.25 inch) and tensile properties according to ASTM D638. Flow channel was measured using 10,000 psi of injection pressure under the previously described molding conditions. weight of about 50,000.

The data in Table 1 is illustrative of the surprising dramatic improvement in flow, indicated as inches of flow channel, with the addition of the flow promoter to the reinforced PPE-PET compositions. Detailed analysis of samples 1, 2, and 3 reveals the surprising increase of almost 50% in flow channel with the addition of the flow promoter with retention of the other physical properties, especially heat distortion temperature. Samples 4–6 are illustrative of the further improvements in heat distortion that can be obtained with the addition of the optional heat enhancing non-fibrous filler in combination with a poly(tetrafluoroethylene) resin.

TABLE 1

| sample | 1 | 2 | 3 | 4 | 5 | 6 |
|---|---|---|---|---|---|---|
| PPE | 12.5 | 12.5 | 12.5 | 12.5 | 12.5 | 12.5 |
| PET | 41 | 41 | 41 | 41 | 41 | 41 |
| PC | 12 | 12 | 12 | 12 | 12 | 12 |
| GLASS | 27.7 | 27.7 | 27.7 | 27.7 | 27.7 | 27.7 |
| HIPS | 12.5 | 12.5 | 12.5 | 12.5 | 12.5 | 12.5 |
| IM | 4 | 4 | 4 | 4 | 4 | 4 |
| TALC | — | — | — | 0.1 | 0.1 | 0.1 |
| PTFE | — | — | — | 0.1 | 0.1 | 0.1 |
| FP | — | 5 | 10 | — | 5 | 10 |
| ADDS | 0.8 | 0.8 | 0.8 | 0.8 | 0.8 | 0.8 |
| TEN. STR. | 16.7 | 19.3 | 18.7 | 18.3 | 17.5 | 17.9 |
| TE | 5.8 | 6 | 6.2 | 7.1 | 6.8 | 6.6 |
| FS | 25.6 | 26.9 | 25.6 | 26 | 20.1 | 23.8 |
| FM | 1 | 1.2 | 1.1 | 1 | 0.9 | 0.9 |

TABLE 1-continued

| sample | 1 | 2 | 3 | 4 | 5 | 6 |
|---|---|---|---|---|---|---|
| NI | 1.7 | 1.7 | 1.63 | 1.7 | 1.5 | 1.4 |
| U-NI | 12.1 | 10.2 | 10.2 | 10.2 | 10 | 9.3 |
| DYN | 82 | 60 | 59 | 71 | 63 | 55 |
| FC | 36 | 39 | 44+ | 22 | 31 | 34 |
| HDT | 261 | 222 | 218 | 259 | 265 | 260 |

TEN. STR. is tensile strength at break in Kpsi.
TE is tensile elongation at break in %.
FS is flexural strength in Kpsi.
FM is flexural modulus in 100× Kpsi.
NI is notched Izod impact strength in ft-lb/ in.
U-NI is un-notched Izod in ft-lbs.
DYN is Dynatup dart impact in in-lbs.
FC is flow channel in inches.
HDT is heat distortion under 264 psi load presented in °F.

What is claimed:

1. A composition comprising:
   a) a poly(phenylene ether) resin;
   b) a polyester resin;
   c) an amount of a polycarbonate resin sufficient to effectively enhance the ductility of the composition;
   d) an amount of at least one reinforcing filler sufficient to effectively increase the stiffness of the composition; and
   e) a terpene-phenol material.

2. The composition of claim 1, wherein the polyester resin is a poly(ethylene terephthalate) resin.

3. The composition of claim 2, wherein the reinforcing filler comprises glass fibers.

4. The composition of claim 3, wherein the terpene-phenol material is present in amount sufficient to afford a composition with at least about a 10% increase in flow than the same composition without the terpene-phenol material.

5. The composition of claim 4, wherein the terpene phenol material comprises a condensate of α-pinene and phenol having a α-pinene to phenol weight ratio greater than about 1:1 and a softening point greater than about 212° F.

6. The composition of claim 5, wherein the terpene phenol material has a softening point greater than about 240° F.

7. The composition of claim 1, further comprising an amount of a non-fibrous filler in combination with a poly(tetrafluoroethylene) resin sufficient to effectively enhance the heat distortion temperature of the composition.

8. The composition of claim 7, wherein the non-fibrous filler is selected from the group consisting of talcs, clays, micas, metal sulfates, calcium carbonates, silicates and mixtures thereof.

9. The composition of claim 8, wherein the non-fibrous filler is talc and wherein said talc is added in an amount sufficient to afford a composition with a heat distortion temperature of at least 250° F.

10. The composition of claim 1, further comprising at least one impact modifier.

11. The composition of claim 1, further comprising at least one non-elastomeric polymer of an alkenylaromatic compound.

12. A composition comprising:
   (a) about 15–50% by weight of at least one poly(phenylene ether) resin;
   (b) about 20–80% by weight of at least one polyester resin, the weight ratio of poly(phenylene ether) resin to the polyester resin being at most about 1.2:1;
   (c) about 3–50% by weight of at least one polymer containing a substantial proportion of aromatic polycarbonate units and having a weight average molecular weight of at least about 40,000 as determined by gel permeation chromatography relative to polystyrene or a blend thereof with a styrene homopolymer;

(d) about 5–60% by weight of at least one reinforcing filler;

(e) about 20% by weight of a terpene-phenol material;

(f) optionally, about 0.05–5% by weight of a mixture of a non-fibrous filler selected from the group consisting of talcs, clays, micas, metal sulfates, calcium carbonates, silicates and mixtures thereof and a poly(tetrafluoroethylene) resin wherein the weight ratio of the non-fibrous filler to the poly(tetrafluoroethylene) resin is between about 1:4 and about 4:1;

(g) optionally, up to about 15% by weight of at least one impact modifier;

(h) optionally, up to about 20% by weight of at least one non-elastomeric polymer of an alkenyl aromatic compound;

(i) optionally, up to about about 2% by weight of a additive package comprising at least one additive selected from the group consisting of hindered phenols, thio compounds and fatty amides; and wherein all of said weight percentages are based on the total weight of the composition.

13. The composition of claim 12, wherein the polyester resin is a poly(ethylene terephthalate) resin.

14. The composition of claim 12, wherein the terpene phenol material comprises a condensate of α-pinene and phenol having a α-pinene to phenol weight ratio greater than about 1:1 and a softening point greater than about 212° F.

15. The composition of claim 14, wherein the terpene phenol material has a softening point greater than about 240° F.

16. The composition of claim 12, wherein component (f) consists of about a 1:1 weight to weight mixture of talc and poly(tetrafluoroethylene) resin and is present in an amount of about 0.2% by weight based on the total weight of the composition.

17. The composition of claim 16, wherein the composition has a heat distortion temperature of at least 250° F.

18. The composition of claim 12, wherein the composition has an improvement in flow of at least about 10% greater than the same composition without the terpene-phenol material.

19. A composition consisting essentially of:

(a) a poly(phenylene ether) resin;

(b) a polyester resin;

(c) a polycarbonate resin;

(d) at least one reinforcing filler;

(e) a terpene phenol material;

(f) optionally, a non-fibrous filler in combination with a poly(tetrafluoroethylene) resin;

(g) optionally, at least one impact modifier; and (h) optionally, at least one non-elastomeric polymer of an alkenyl aromatic compound.

20. The composition of claim 19, wherein the polyester resin is a poly(ethylene terephthalate) resin.

21. The composition of claim 19, wherein the terpene phenol material comprises a condensate of α-pinene and phenol having a α-pinene to phenol weight ratio greater than about 1:1 and a softening point greater than about 212° F.

22. The composition of claim 21, wherein the non-fibrous filler is talc and the reinforcing filler is glass fiber and wherein the amounts of said talc and said glass fiber are sufficient to afford a composition having a heat distortion temperature of at least about 250° F.

23. An article made from the composition of claim 1.

* * * * *